United States Patent
Rojas-Cessa et al.

(10) Patent No.: US 9,392,475 B2
(45) Date of Patent: Jul. 12, 2016

(54) DETERMINATION OF DOWNLOAD THROUGHPUT OF WIRELESS CONNECTION WITH COMPOUND PROBES

(71) Applicant: New Jersey Institute of Technology, Newark, NJ (US)

(72) Inventors: Roberto Rojas-Cessa, Brooklyn, NY (US); Khondaker M. Salehin, Kearny, NJ (US)

(73) Assignee: NEW JERSEY INSTITUTE OF TECHNOLOGY, Newark, NJ (US)

( * ) Notice: Subject to any disclaimer, the term of this patent is extended or adjusted under 35 U.S.C. 154(b) by 137 days.

(21) Appl. No.: 14/349,313

(22) PCT Filed: Aug. 20, 2013

(86) PCT No.: PCT/US2013/055844
§ 371 (c)(1),
(2) Date: Apr. 2, 2014

(87) PCT Pub. No.: WO2014/039253
PCT Pub. Date: Mar. 13, 2014

(65) Prior Publication Data
US 2014/0293819 A1    Oct. 2, 2014

Related U.S. Application Data

(60) Provisional application No. 61/697,357, filed on Sep. 6, 2012.

(51) Int. Cl.
*H04W 4/00* (2009.01)
*H04W 24/06* (2009.01)
(Continued)

(52) U.S. Cl.
CPC ........... *H04W 24/06* (2013.01); *H04L 43/0888* (2013.01); *H04L 43/10* (2013.01); *H04W 24/08* (2013.01)

(58) Field of Classification Search
CPC ...................................................... H04W 24/06
USPC ......................................................... 370/252
See application file for complete search history.

(56) References Cited

U.S. PATENT DOCUMENTS

| 2003/0152034 A1 | 8/2003 | Zhang et al. |
| 2008/0008178 A1 | 1/2008 | Tychon et al. |

(Continued)

OTHER PUBLICATIONS

Gast, M., "When Is 54 Not Equal to 54? A Look at 802.11a, b, and g Throughput," accessed at http://www.oreillynet.com/pub/a/wireless/2003/08/08/wireless_throughput.html, Aug. 14, 2014, pp. 1-4.

(Continued)

*Primary Examiner* — Farah Faroul
(74) *Attorney, Agent, or Firm* — Turk IP Law, LLC

(57) ABSTRACT

Technologies are generally described to determine a download throughput of a wireless connection in an environment hosting multiple wired and wireless connections. According to some examples, a compound probe may be transmitted from a source to a wireless destination. Another compound probe may also be transmitted from the source to the wireless destination. The compound probes may include multiple packets without any dispersion gap. Next, an average intra-packet gap (AIPG) and a minimum intra-packet gap (MIPG) may be determined from the first compound probe. Furthermore, another MIPG may be determined from the later compound probe. The download throughput from the source to the wireless destination may be computed from the AIPG and the MIPGs.

17 Claims, 8 Drawing Sheets

(51) Int. Cl.
  H04L 12/26    (2006.01)
  H04W 24/08    (2009.01)

(56) References Cited

U.S. PATENT DOCUMENTS

2011/0149751 A1    6/2011    Li et al.
2014/0043975 A1    2/2014    Zhu et al.

OTHER PUBLICATIONS

"Packet size distribution comparison between Internet links in 1998 and 2008," Caida, The Cooperative Association for Internet Data Analysis, accessed at http://www.caida.org/research/traffic-analysis/pkt_size_distribution/graphs.xml, Last modified on Jun. 14, 2010, pp. 2.
"Sharkfest '13 Special Events," Wireshark Developer and User Conference, UC Berkeley, Jun. 16-18, 2013, accessed at http://sharkfest.wireshark.org/special_events.html, pp. 1-3.
"Endace DAG 7.5G2 datasheet" accessed at http://www.emulex.com/artifacts/b4469f7d-ecee-4022-8232-295390c7c036/end_ds_all_dag_7.5g2.pdf., accessed on Jun. 18, 2014, pp. 1-2.
"Iperf," accessed at http://iperf.sourceforge.net/, accessed on Jun. 18, 2014, p. 1.
Almes, G., et al., "A One-way Delay Metric for IPPM", RFC 2679, accessed at http://www.ietf.org/rfc/rfc2679.txt, Sep. 1999, pp. 19.
Almes, G., et al., "A Round-trip Delay Metric for IPPM," RFC 2681, accessed at http://www.ietf.org/rfc/rfc2681.txt, Sep. 1999, pp. 19.
Anagnostakis, K. G., et al., "Cing: Measuring Network-Internal Delays using only Existing Infrastructure," IEEE INFOCOM 2003, vol. 3, pp. 2112-2121 (2003).
Bolot, J-C., "End-to-End Packet Delay and Loss Behavior in the internet," Conference proceedings on Communications architectures, protocols and applications, vol. 23, Issue 4, pp. 289-298 (1993).
Carter, R.L., and Crovella, M.E. et al., "Measuring Bottleneck Link Speed in Packet-Switched Networks," Performance Evaluation, vol. 27 and 28, pp. 297-318 (1996).
Li, M. et al., "WBest: A Bandwidth Estimation Tool for IEEE 802.11 Wireless Networks," in Proc. 33rd Annual IEEE Conference on Local Computer Networks, pp. 374-381 (2008).
Mah. B. "Pchar: A Tool for Measuring Internet Path Characteristics," accessed at http://www.kitchenlab.org/www/bmah/Software/pchar/, Last modified on Feb. 12, 2005, pp. 1-2.
Paxson, V., "Measurements and Analysis of End-to-End Internet Dynamics," Ph.D. dissertation, University of California, Berkeley, Stanford, California, pp. 409 (1997).
Prasad, R., et al., "Effects of Interrupt Coalescence on Network Measurements," In Proceedings of PAM, pp. 247-256 (2004).
Salehin, K. M., et al., "Scheme to Measure Packet Processing Time of a Remote Host through Estimation of End-Link Capacity", IEEE Transactions on Computers, pp. 1-14 (2013).
Salehin, K.M., and Rojas-Cessa, R., "Combined Methodology for Measurement of Available Bandwidth and Link Capacity in Wired Packet Networks," IET Communications, vol. 4, No. 2, pp. 240-252 (2010).
Salehin, K.M., and Rojas-Cessa, R., "Active Scheme to Measure Throughput of Wireless Access Link in Hybrid Wired-Wireless Network," In Proceedings of IEEE Wireless Communications Letters, vol. 1, Issue 6, pp. 645-648 (2012).
Salehin, K.M., and Rojas-Cessa, R., "Schemes to Measure Available Bandwidth and Link Capacity with Ternary Search and Compound Probe for Packet Networks," 17th IEEE Workshop on Local Metropolitan Area Networks (LANMAN), pp. 1-5 ( 2010).
Sargento, S., and Valadas, R., "Capacity and Cross-Traffic Estimation of All Links in a Path Using ICMP Timestamps," ICN/CONS/MCL, p. 49 (2006).
Shah, H. S., et al., "Available Bandwidth Estimation in IEEE 802.11 based Wireless Networks," In Proc. First ISMA Workshop on Bandwidth Estimation, pp. 1-3 (2003).
Vassis, D., et al., "The IEEE 802.11g Standard for High Data Rate WLANs," IEEE Network, vol. 19, No. 3, pp. 21-26 (2005).
Willmann, P., et al., "An Efficient Programmable 10 Gigabit Ethernet Network Interface Card," 11th International Symposium on High-Performance Computer Architecture, 2005, HPCA-11, pp. 96-107 (2005).
International Search Report and Written Opinion for International Application No. PCT/US2012/062586, mailed on Jan. 14, 2013.
International Search Report and Written Opinion for International Application No. PCT/US2013/055844, mailed on Nov. 1, 2013.
Office Action received for U.S. Appl. No. 13/882,687, mailed Jan. 27, 2015 and filed on Apr. 30, 2013.
J. Sommers and P. Barford, "An active measurement system for shared environments," in Proc. of Internet Measurement Conference, pp. 303-314, (Oct. 2007).
Center for Applied Internet Data Analysis (CAIDA). "Packet size distribution comparison between Internet links in 1998 and 2008." 2 pp (Jun. 2010). Available: http://www.caida.org/research/traffic-analysis/pkt size distribution/graphs.xml.
Sinha et al., "Internet packet size distributions: Some observations," USC/Information Sciences Institute, Tech. Rep. ISI-TR-2007-643, pp. 1-7 (May 2007). Available: http://www.isi.edu/~johnh/PAPERS/Sinha07a.html.
Lee et al. "Not all microseconds are equal: Fine-grained per-flow measurements with reference latency interpolation," in Proc. of ACM Special Interest Group on Data Communication Conference, Delhi, India, pp. 27-38, (Sep. 2010).
Martin, Richard with Elena Malykhina. "Wall street's quest to process data at the speed of light." [Online]. 10 pp, (Apr. 20, 2007) Available: http://www.informationweek.com/news/199200297?pgno=1.
Padmanabhan and Subramanian, "An investigation of geographic mapping techniques for Internet hosts," in Proc. of ACM Special Interest Group on Data Communication Conference, CA, USA, pp. 173-185, (Aug. 2001).
Katz-Bassett et al., "Towards IP geolocation using delay and topology measurements," in Proc. of Internet Measurement Conference, NY, USA, pp. 71-84 (Oct. 2006).
Gueye et al. "Constraint-based geolocation of Internet hosts," IEEE/ACM Transactions on Networking, vol. 14, No. 6, pp. 1219-1232, Taormina, Italy, (Oct. 2006).
Dong et al. "Network measurement based modeling and optimization for IP geolocation," Computer Networks, vol. 56, No. 1, pp. 85-98, (Sep. 2011).
Leinen, Simon, "What flows in a reserach and education network?" SWITCH [Online]. Seoul, South Korea, (Apr. 2009), 13 pp. Available: http://pam2009.kaist.ac.kr/presentation/switch-flows.pdf.
Paxson, Vern, "Measurements and analysis of end-to-end Internet dynamics," Ph.D. dissertation, University of California, Berkeley, Stanford, California, 409 pp, (Apr. 1997).
Dovrolis et al., "Packet dispersion techniques and capacity estimation," IEEE/ACM Transactions on Networking, vol. 12, No. 6, pp. 963-977, (Dec. 2004).
Salehin and Rojas-Cessa, "A combined methodology for measurement of available bandwidth and link capacity in wired packet networks," IET Communications,vol. 4, No. 2, pp. 240-252, (Jul. 2009).
"Endace DAG 7.5G2 datasheet". 2 pp, (Mar. 2013) Available: http://www.endace.com/assets/files/resources/ENDDatasheet\ DAG7.5G2 3.0.pdf.
Mills et al. "RFC 1305—Network time protocol version4: Protocol and algorithms specification." 111pp. (Mar. 1992) Available: http://www.ietf.org/rfc/rfc5905.txt.
Vito et al., "One-way delay measurement: State of art,"IEEE Transactions on Instrumentation and Measurements, vol. 57, No. 12, pp. 2742-2750, (Dec. 2008).
P. Willman et al. "An efficient programmable 10 gigabit ethernet network interface card," in Proc. of IEEE International Symposium on High-Performance Computer Architecture, CA, USA, pp. 96-107, (Nov. 2005).
Bi et al. "On estimating clock skew for one-way measurement," Computer Communications, vol. 29, No. 8, Abstract, 1 page, (May 2006).

(56) References Cited

OTHER PUBLICATIONS

K. Ramakrishnan, "Performance considerations in designing network interfaces," IEEE Journal on Selected Areas in communications, vol. 11, No. 2, pp. 203-219, (Feb. 1993).
Mandeville and Perser, "RFC 2889—Benchmarking methodology for LAN switching devices." CQOS Inc. Spirent COmmunications, 33 pp. (Aug. 2000). Available: http://www.ieff.org/rfc/rfc2889.txt.
Angrisani et al., "Measurement of processing and queuing delays introduced by an open-source router in a single-hop network," IEEE Transations on Instrumentation and Measurement, vol. 55, No. 4, pp. 1065-1076, (Aug. 2006).
K. Lai and M. Baker, "Measuring link bandwidths using a deterministic model of packet delay," in Proc. of ACM Special Interest Group on Data Communication Conference, Stockholm, Sweden, pp. 283-294, (Sep. 2000).
K. Salehin and R. Rojas-Cessa, "Scheme to measure relative clock skew of two Internet hosts based on end-link capacity," IET Electronics Letters, vol. 48, No. 20, pp. 1282-1284, (Sep. 2012).
Harfoush et al, "Measuring bottleneck bandwidth of targeted path segments," in Proc. of IEEE International Conference on Computer Communications, CA, USA, pp. 2079-2089, (Oct. 2003).
Spirent Communications, "Highest port density performance analysis system: SmartBits 6000C." Specification, (2004) Available:http://www.spirent.com/~/media/Datasheets/Broadband/ObsoleteSMBTM/SmartBits%206000C.pdf.
Y.Ghiassi-Farrokhfal and J. Liebeherr, "Output characterization of constant bit rate traffic in FIFO networks," IEEE Communications Letters, vol. 13, No. 8, pp. 618-620, (Aug. 2009).
C. Choon. High speed networks and multimedia networking. 13 pp, (Aug. 2005) Available: http://www.comp.nus.edu.sg/~cs5224/lectures/traffic.pdf.
K. Lai, "Measuring bandwidth," in Proc. of IEEE International Conference on Computer Communications, NY, USA, pp. 235-245, (Mar. 1999).
Kapoor et al., "CapProbe: A simple and accurate capacity estimation technique," in Proc. of ACM Special Interest Group on Data Communication Conference, OR, USA, pp. 67-78, Portland, OR (Sep. 2004).
B. Mah. "pchar: A tool for measuring Internet path characteristics." Kitchenlab, 2 pp. (Feb 2005) . Available:http://www.kitchenlab.org/www/bmah/Software/pchar/.
Jin et al., "Network characterization service (NCS)." Berkeley, CA. 11 pp, (Dec. 2011) Available: http://web.archive.org/web/20111229041049/http://www-didc.lbl.gov/NCS/.
J. Postel. "RFC 792—Internet Control Message Protocol." 21 pp. (Sep. 1981). Available: http://tools.ieff.org/html/rfc792.
Qin et al, "Task-execution scheduling schemes for network measurement and monitoring," Computer Communications, vol. 33, No. 2, pp. 124-135, (Feb. 2010).
J. Bolot, "Characterizing end-to-end packet delay and loss in the internet," Journal of High-Speed Networks, vol. 2, No. 3, pp. 305-323, (Dec. 1993).
B. Ngamwongwattana and R. Thompson, "Sync & Sense: Voip measurement methodology for assessing one-way delay without clock synchronization," IEEE Transactions on Instrumentation and Mesurement, vol. 59, No. 5, pp. 1318-1326, (May 2010).
Lakshminarayanan et al., "Bandwidth estimation in broadband access networks," in Proc. of Internet Measurement Conference, Sicily, Italy, pp. 314-321, (Oct. 2004).
Angrisani et al., "Modeling and measuring the capacity of communication networks," IEEE Transactions on Instrumentation and Measurement, vol. 59, No. 5, pp. 1065-1072, (May 2010).
Li et al., "Wbest: A bandwidth estimation tool for IEEE 802.11 wireless networks," in Proc. of IEEE Conference on Local Computer Networks (LCN), Que., Canada, pp. 374-381, (Oct. 2008).
Shah et al., "Available bandwidth estimation in ieee 802.11-based wireless networks," in Proc. of First ISMA Workshop pn Bandwidth Estimation,CA, USA, p. 1-3, (Dec. 2003).
Vassis et al., "The IEEE 802.11g standard for high data rate wlans," IEEE Network, vol. 19, No. 3, pp. 21-26, May 2005.

Belkin Corporation, "Belkin wireless cable/dsl gateway router." User Manual, (2002) Available: http://www.belkin.com/support/d1/f5d6231-4v2-%20manual.pdf.
"Iperf." 1 page Sourceforge, [Online]. Available: http://iperf.sourceforge.net/. (Mar. 2008).
M. Gast. "When is 54 not equal to 54? a look at 802.11a, b, and g throughput." (Aug. 2008) 4 pp. Available: http://www.oreillynet.com/pub/a/wireless/2003/08108/wireless throughput.html\?page=2.
Kreibich et al, "Netalyzr: Illuminating the edge network," in Proc. of Internet Measurement Conference, Melbourne, Australia, pp. 246-259, Nov. 2010.
Johnsson et al.,"An analysis of active end-to-end bandwidth measurements in wireless networks," in Proc. of 4th IEEE/IFIP Workshop on End-to-End Monitoring Techinique and Services, BC, Canada, pp. 74-81, (Jul. 2006).
A. Hernandez and E. Magana, "One-way delay measurement and characterization," in Proc. of IEEE International Conference on Networking and Services, Athens, Greece, 6 pp, Jun. 2007.
G. Jin and B. Tierney, "System capability effects on algorithms for network bandwidth measurements," in Proc. of Internet Measurement Conference, FL, USA, pp. 27-38, Oct. 2003.
Csabai et al., "ETOMIC advanced network monitoring system for future internet experimentation," in Proc. of International Conference on Testbeds and Research Infrastructures for the Development of Networks and Communities, Berlin, Germany, pp. 243-254, May 2010.
K. Harfoush et al., "Measuring capacity bandwidth of targeted path segments," IEEE/ACM Transactions on Networking, No. 1, pp. 80-92, Feb. 2009.
K. Salehin and R. Rojas Cessa, "Active scheme to measure throughput of wireless access link in hybrid wired-wireless ietwork," IEEE Wireless Communications Letters, vol. 1, No. 6, pp. 645-648, Dec. 2012.
S. Zander and S. J. Murdoch, "An improved clock-skew measurement technique for revealing hidden services," in Proc. of 17th USENIX Security Symposium, CA, USA, pp. 211-225, Aug. 2008.
4LMES et al. "A round-trip delay metric for Ippm." 19 pp Network Working Group, Sep. 1999 Available: http://www.ietf.org/rfc/rfc2681.txt.
Salehin and Rojas-Cessa, "Measurement of Packet Processing Time of an Internet Host using Asynchronous Packet capture at the Data-Link Layer," Proc. of IEEE International Conference on Communications, Budapest, Hungary, pp. 1-5, Jun. 2013.
Salehin and Rojas-Cessa, "Packet-pair sizing for controlling packet dispersion on wired heterogeneous networks," in Proceedings of IEEE International Conference on Computing, Networking and Communication, Network Algorithm and Jerformance Evaluation Symposium CA, pp. 1-5, Jan. 2013.
K. Salehin, and R. Rojas-Cessa, "Schemes to Measure Available Bandwidth and Link Capacity with Ternary Search and Compound Probe for Packet Networks," in Proc. of IEEE Workshop on Local and Metropolitan Area Networks, NJ, USA, pp. 1-5, May 2010.
K. Salehin, and R. Rojas-Cessa, "Ternary Search Based Scheme to Measure Link Available Bandwidth in Wired Netowrks," in Proc. of IEEE Global Communications Conference, FL, USA, pp. 1-5, Dec. 2010.
K. Salehin, R. Rojas-Cessa, C. Lin, Z. Dong, and T. Kijkanjanarat, "Scheme to Measure Packet Processing Time of a Remote Host through Estimation of End-Link Capacity," major revision, submitted to IEEE Transactions on Computers.
R. Rojas-Cessa, K. Salehin, and K. Egoh "Experimental Performance Evaluation of a Virtual Software Router," in Proc. of IEEE Workshop on Local and Metropolitan Area Networks, NC, USA, pp. 1-2, Oct. 2011 (Poster).
M. Garetto and D. Towsley, "Modeling, simulation and measurements of queuing delay under long-tail Internet traffic," in Proc. of ACM Special Interest Group on Measurement and Evaluation Conference, CA, USA, pp. 1-11, Jun. 2003.
N. McKeown. High performance routers—Talk at IEE, London UK. Oct. 18, Oct. 2001.[Online]. Available: http://tiny-tera.stanford.edu/~nickm/talks/index.html.

(56) References Cited

OTHER PUBLICATIONS

R. Prasad, M. Jain, and C. Dovrolis, "Effects of interrupt coalescence on network measurements," in Proc. of Passive and Active Measruement Conference, France, pp. 247-256, Apr. 2004.
R. Rojas-Cessa, K. Salehin, and K. Egoh "Experimental Performance Evaluation of a Virtual Software Router," in Proc. of IEEE Sarnoff Symposium, NJ, USA, pp. 1-5, May 2012.
S. Savage. "IP router design." Feb. 2005 [Online]. Available: http://cseweb.ucsd.edu/classes/wi05/cse123a/Lec8.pdf.
Khondaker Musfakus Salehin, "End-to-End Network Measurement for Wired and Wireless Networks" Ph.D. Dissertation, Department of Electrical and Computer Engineering, New Jersey Institute of Technology, Apr. 2013.
Papagiannaki et al., "Measurement and analysis of single-hop delay on an IP backbone network," IEEE Journal of Selected Areas of Communications, vol. 21, No. 6, pp. 908-921, 2003.
R. Govindan and V. Paxson, "Estimating router ICMP generation time," in Pric. of Passive and Active Measurement COnference, CO, USA, pp. 1-8, 2002.
V. Paxson, "On calibrating measurement of packet transit times," in Proc. of ACM Special Interest Group on Measurement and Evaluation Conference, WI, USA, pp. 11-21, 1998.
S. Moon et al "Estimation and removal of clock skew from network measurement delays," in Proc. of IEEE International Conference on Computer Communications, NY, USA, pp. 227-234, 1998.
Zhang et al. "Clock synchronization algorithm for network measurements," in Proc. of IEEE International Conference on Computer Communiations, NY, USA, pp. 160-169, 2002.
D. Mills, "Internet time synchronization: the network time protocol," IEEE Transactions on Communications, vol. 39, No. 10, pp. 1482-1493, 1991.
Dong, J., et al., "Secure High-Throughput Multicast Routing in Wireless Mesh Networks," IEEE Transactions on Mobile Computing, vol. 10, No. 5, pp. 653-668 (2011).
Dovrous, C., et al., "Packet-Dispersion Techniques and a Capacity-Estimation Methodology," IEEE/ACM Transactions on Networking, vol. 12, No. 6, pp. 963-977 (2004).
Downey, A.B., et al., "Using pathchar to estimate Internet link characteristics," In Proceedings of ACM SIGCOMM, pp. 241-250 (1999).
Harfoush K., et al., "Measuring Bottleneck Bandwidth of Targeted Path Segments," In Proceedings of IEEE INFOCOM, vol. 3, pp. 2079-2089 (2003).
Hu, N., et al., "Evaluation and Characterization of Available Bandwidth Probing Techniques," IEEE JSAC, vol. 21, No. 6, pp. 879-894 (2003).
Jacobson, V., "A Tool to infer Characteristics of Internet Paths" accessed at ftp://ftp.ee.lbl.gov/pathchar/msri-talk.pdf, pp. 1-21 (1997).
Johnsson, A. and Björkman, M., "On Measuring Available Bandwidth in Wireless Networks," In Proceedings of IEEE 33rd Conference on Local Computer Networks, pp. 861-868 (2008).
Johnsson, A., et al., "An Analysis of Active End-to-end Bandwidth Measurements in Wireless Networks," In Proceeding 4th IEEE/IFIP Workshop on End to End Monitoring Technique and Services, pp. 74-81 (2006).
Lai, K. and Baker, M., "Measuring Link Bandwidths Using a Deterministic Model of Packet Delay," In Proceedings of ACM SIGCOMM, pp. 283-294 (2000).
Lakshminarayanan K., et al., "Bandwidth Estimation in Broadband Access Networks," In Proceedings IMC'04, pp. 314-321 (2004).
Leinen, S., "What Flows in a Research and Education Network?," SWITCH Serving Swiss Universities, Apr. 2009, pp. 1-13.

COMPUTER PROGRAM PRODUCT 800

SIGNAL BEARING MEDIUM 802

804 AT LEAST ONE OF

ONE OR MORE INSTRUCTIONS TO PERFORM OR CAUSE TO BE PERFORMED
  TRANSMITTING A FIRST COMPOUND PROBE FROM A SOURCE TO A WIRELESS DESTINATION;
  TRANSMITTING A SECOND COMPOUND PROBE FROM THE SOURCE TO WIRELESS DESTINATION;
  DETERMINING A FIRST AVERAGE INTRA-PACKET GAP (AIPG) AND A FIRST MINIMUM INTRA-PACKET GAP (MIPG) FROM THE FIRST COMPOUND PROBE;
  DETERMINING A SECOND MIPG FROM THE SECOND COMPOUND PROBE; AND/OR
  COMPUTING A THROUGHPUT FROM THE SOURCE TO THE WIRELESS DESTINATION BASED ON THE FIRST AIPG, THE FIRST MIPG, AND THE SECOND MIPG.

| COMPUTER-READABLE MEDIUM 806 | RECORDABLE MEDIUM 808 | COMMUNICATIONS MEDIUM 810 |

FIG. 8

DETERMINATION OF DOWNLOAD THROUGHPUT OF WIRELESS CONNECTION WITH COMPOUND PROBES

CROSS REFERENCE TO RELATED APPLICATIONS

This application is the U.S. National Stage filing under 35 U.S.C. §371 of PCT Application Ser. No. PCT/US 2013/055844 filed on Aug. 20, 2013, which in turn claims priority under 35 U.S.C. §119(e) to Provisional Application No 61/697,357 filed on Sep. 6, 2012. The PCT and Provisional Application are hereby incorporated by reference in their entirety.

BACKGROUND

Unless otherwise indicated herein, the materials described in this section are not prior art to the claims in this application and are not admitted to be prior art by inclusion in this section.

The proliferation of various wireless technologies has impacted demand for wireless spectrum including wireless local area networks, wide area networks, cellular telephone systems, and others. The demand for wireless spectrum suitable for wireless communications networks has grown substantially in recent history. The demand is expected to accelerate even more in the near future because of exponential growth in wireless broadband data network traffic.

Accurate measurement of throughput of wireless networks is part of practical network traffic control and efficient utilization of wireless networks to meet exponential growth. Legacy solutions, based on intra-packet gap calculation and end-to-end delay estimation, typically measure the throughput of a wireless connection by assuming that the wireless connection is the bottleneck within a hybrid wireless and wired network. However, when the wireless connection is not the bottleneck, legacy solutions may fail to function because a probing packet may not avoid an effect of the bottleneck on a wired connection before reaching a wireless connection.

SUMMARY

The present disclosure generally describes techniques for measurement or otherwise determination of a download throughput of a wireless connection with compound probes.

According to some examples, a method is provided to determine a download throughput of a wireless connection with compound probes. An example method may include transmitting a first compound probe from a source to a wireless destination, transmitting a second compound probe from the source to the wireless destination, and determining a first average intra-packet gap (AIPG) and a first minimum intra-packet gap (MIPG) from the first compound probe. The method may further include determining a second MIPG from the second compound probe and computing the download throughput from the source to the wireless destination based on the first AIPG, the first MIPG, and the second MIPG.

According to other examples, an apparatus is provided. The apparatus may include a controller to determine a download throughput of a wireless connection with compound probes and a compound probe module operatively coupled to the controller. The compound probe module may be configured to control transmission of a first compound probe from a source to a wireless destination, include a first heading packet and a first trailing packet in the first compound probe, control transmission of a second compound probe from the source to the wireless destination, and include a second heading packet and a second trailing packet in the second compound probe. The compound probe module may be further configured to determine a first average intra-packet gap (AIPG) and a first minimum intra-packet gap (MIPG) from the first compound probe, determine a second MIPG from the second compound probe, and compute the download throughput from the source to the wireless destination based on the first AIPG, the first MIPG, and the second MIPG.

According to further examples, a computing device is provided to determine a download throughput of a wireless connection with compound probes. The device may include a memory and a controller configured to manage a compound probe module in conjunction with the instructions stored in the memory. The controller may be configured to transmit a first compound probe from a source to a wireless destination, include a first heading packet and a first trailing packet in the first compound probe, transmit the first heading packet and the first trailing packet back-to-back without a separation between a last bit of the first heading packet and a first bit of the first trailing packet, and transmit a second compound probe from the source to the wireless destination. The controller may also be configured to include a second heading packet and a second trailing packet in the second compound probe, transmit the second heading packet and the second trailing packet back-to-back without a separation between the last bit of the second heading packet and the first bit of the second trailing packet, determine a first average intra-packet gap (AIPG) and a first minimum intra-packet gap (MIPG) from the first compound probe, determine a second MIPG from the second compound probe, and compute a throughput from the source to the wireless destination based on the first AIPG, the first MIPG, and the second MIPG.

According to yet further examples, a computer-readable storage medium may be provided with instructions stored thereon to determine a download throughput of a wireless connection with probes. The instructions may cause a method to be performed in response to execution, where the method may include transmitting a first compound probe from a source to a wireless destination, including a first heading packet and a first trailing packet in the first compound probe, transmitting the first heading packet and the first trailing packet back-to-back between a last bit of the first heading packet and a first bit of the first trailing packet, and transmitting a second compound probe from the source to the wireless destination. The method may also comprise including a second heading packet and a second trailing packet in the second compound probe, transmitting the second heading packet and the second trailing packet back-to-back between a last bit of the second heading packet and a first bit of the second trailing packet, determining a first intra-packet gap and a second intra-packet gap from the first compound probe, determining a third intra-packet gap from the second compound probe, and computing a throughput from the source to the wireless destination based on the first intra-packet gap, the second intra-packet gap, and the third intra-packet gap.

According to yet other examples, a computer readable medium may store instructions to determine a download throughput of wireless connection with compound probes. The instructions may cause a method to be performed in response to execution, the method being similar to the methods described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 illustrates a block diagram of an example computer program product to measure or otherwise determine a download throughput of a wireless connection with probes, all arranged in accordance with at least some embodiments described herein.

DETAILED DESCRIPTION

Figure 1:
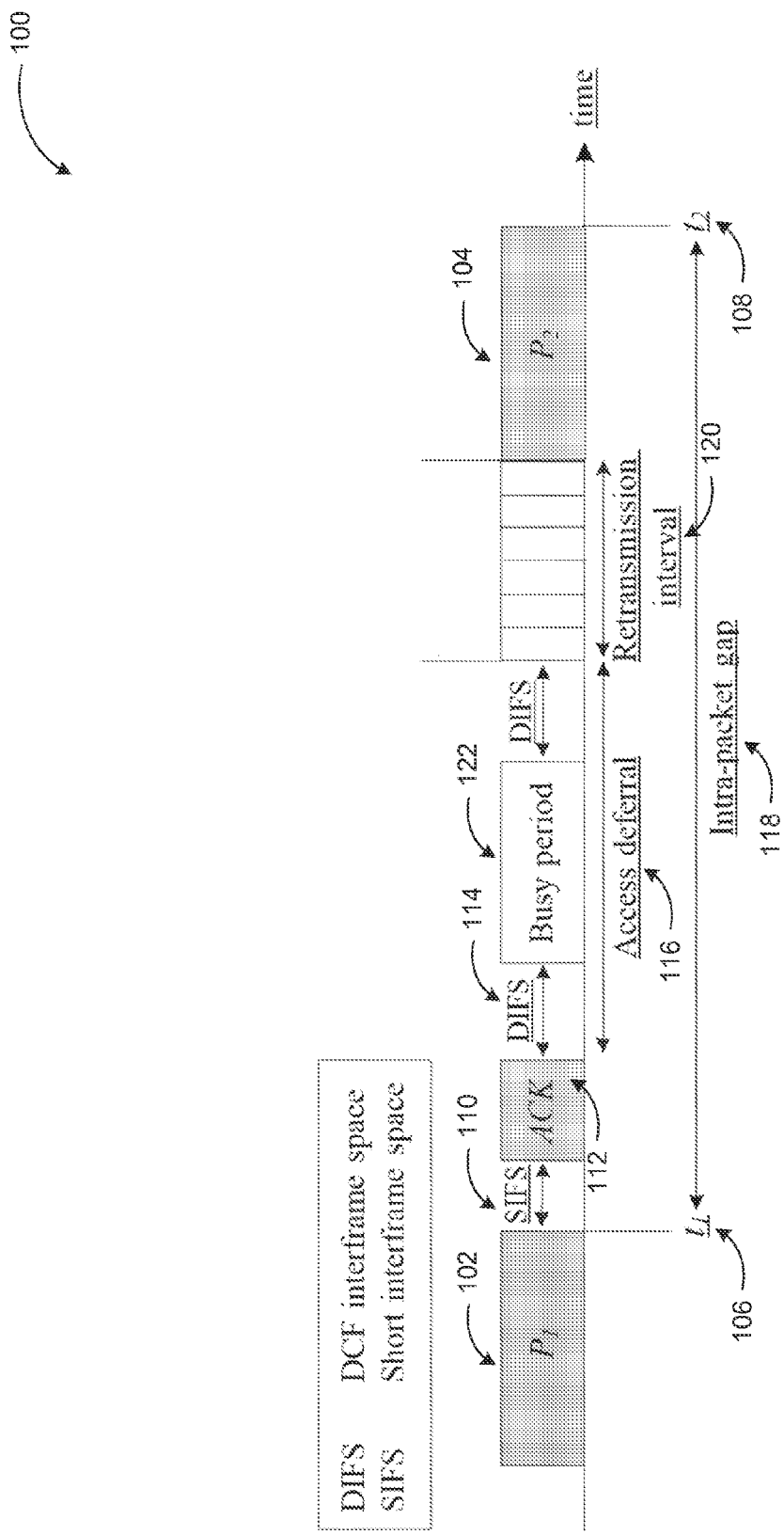
FIG. 1 illustrates an example schema presenting an intra-packet gap between packets transmitted wirelessly.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to determination of a download throughput of a wireless connection with compound probes.

Briefly stated, technologies are generally described to measure or otherwise determine a download throughput of a wireless connection in an environment hosting multiple wired and wireless connections. According to some examples, a compound probe may be transmitted from a source to a wireless destination. Another compound probe may also be transmitted from the source to the wireless destination. The compound probes may include multiple packets without any dispersion gap. Next, an average intra-packet gap (AIPG) and a minimum intra-packet gap (MIPG) may be determined from the first compound probe. Furthermore, another MIPG may be determined from the later compound probe. A download throughput from the source to the wireless destination may be computed from the AIPG and the MIPGs. The AIPG and MIPG may be represented in units of time, such as seconds or portions/multiples thereof.

FIG. 1 illustrates an example schema presenting an intra-packet gap between packets transmitted wirelessly, arranged in accordance with at least some embodiments described herein.

Diagram 100 shows an intra-packet gap 118, which may be used to measure or otherwise determine download throughput of a wireless connection. Share access, collisions, and channel waiting in wireless networks may complicate measurement or other determination of a download throughput of a wireless connection. The transmission speed of a pair of packets, $P_1$ (102) and $P_2$ (104), over a wireless connection may depend on a capacity of the connection, a cross traffic load, number of retransmission interval (120) attempts to access a channel, a time period to receive acknowledgement (ACK) 112, delays associated with a distributed coordination function interframe space (DIFS) 114 and short interframe space (SIFS) 110, and/or other factors. In addition, an access deferral 116 may be identified as a time period including a busy period 122 and adjacent DIFSs. Retransmission interval 120 may be identified as a time period following DIFS adjacent to the busy period 122.

A download throughput, T, of wireless connection may be computed by:

$$T = s/(t_2 - t_1) \quad [1]$$

where s is the packet size of $P_2$, and $t_2$ (108) and $t_1$ (106) are arrival times of $P_1$ and $P_2$, respectively, at a destination host (that is, an end host or other destination device connected through the wireless connection). The intra-packet gap 118 between $P_1$ and $P_2$ is $t_2 - t_1$. However, if $t_2 - t_1$ is affected by cross-traffic load and capacity of a wired connection over a hybrid wired and wireless path, a throughput estimation may produce an erroneous outcome.

Figure 2:
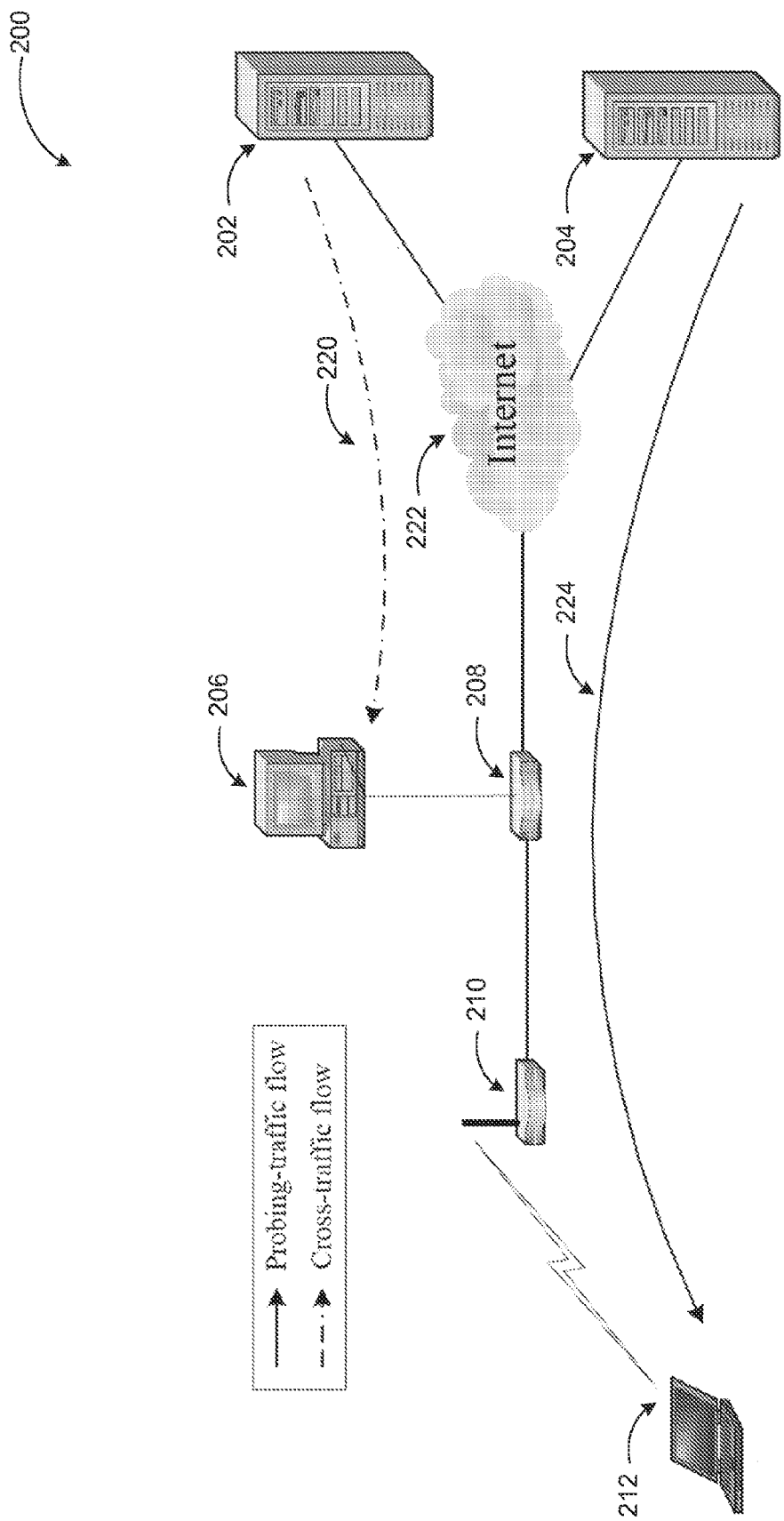
FIG. 2 illustrates an example network where a download throughput of a wireless connection may be measured or otherwise determined with compound probes.

FIG. 2 illustrates an example network where a download throughput of a wireless connection may be measured or otherwise determined with compound probes, arranged in accordance with at least some embodiments described herein.

Diagram 200 shows an example network scheme, where a download throughput of a wireless connection may be measured or otherwise determined with compound probes. In an example scenario, a first source host 202 may generate cross traffic 220, thereby sharing bandwidth with a second source host 204. The first source host 202 and the second source host 204 may share a wired connection 224 between internet 222 and router 208. The probing traffic may travel through wired and wireless connections between the internet 222, the router 208 and wireless access point (AP) 210.

Legacy applications, relying on intra-packet gap calculation and end-to-end delay estimation, may measure the download throughput of a hybrid wired-wireless path by assuming that the wireless connection constitutes a bottleneck connection. The bottleneck connection may be the connection with a minimum or otherwise reduced bandwidth of the hybrid wired-wireless path. If the wireless connection is not the bottleneck connection of the path, the legacy applications may not function properly. The legacy applications may not function because the probing packets may not avoid the effect of the bottleneck (that is, additional gap or delay) on a wired connection located before the wireless AP 210 along the measurement path.

An application according to some embodiments, for example a measurement application, may measure or otherwise determine the download throughput of the hybrid wired-wireless path without being affected by the location of the bottleneck connection or where the wireless connection is not the bottleneck connection of the measured path. Two compound probes of packet pairs may be used for the measurement/determination, where each pair may be called a compound probe. A compound probe may also be referred to as a probing train. The measurement application may determine a minimum or otherwise reduced packet gap relative to a larger packet gap and an average packet gap of each compound probe to estimate a capacity and a download throughput of the wireless connection, over the wired-wireless path. Furthermore, the measurement application may be resilient against cross-traffic loads on the wired connections of the path.

Figure 3:
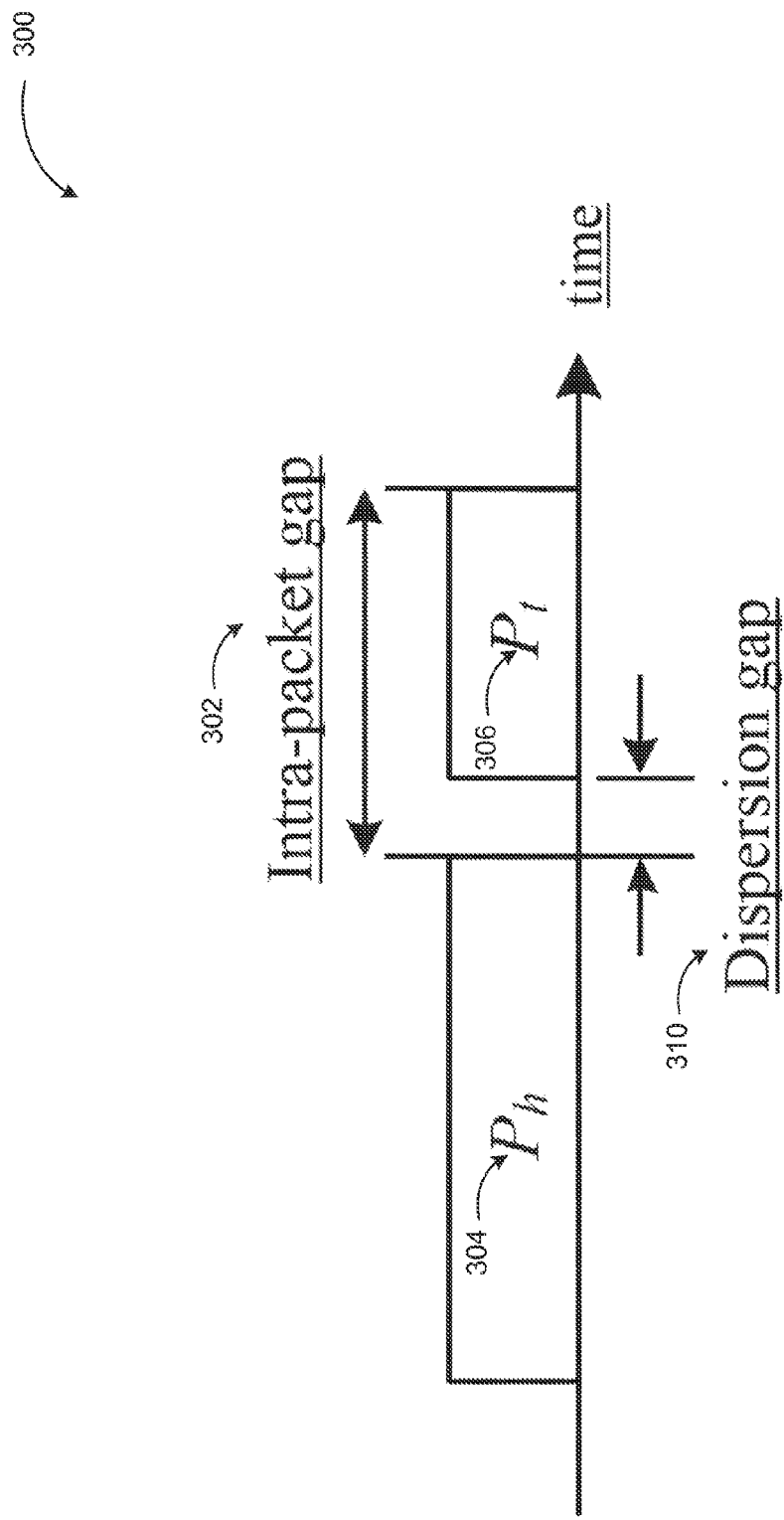
FIG. 3 illustrates an example compound probe, which may be used to measure or otherwise determine a download throughput of a wireless connection.

FIG. 3 illustrates an example compound probe, which may be used to measure or otherwise determine a download throughput in a wireless connection, arranged in accordance with at least some embodiments described herein.

Diagram 300 shows a packet-pair structure called a compound probe. The compound probe may include a large heading packet ($P_h$ 304) followed by a small trailing packet ($P_t$ 306). The intra-packet gap 302 value of a compound probe (that is, the elapsed time between the last bits of $P_h$ 304 and $P_t$ 306) may be proportional to or otherwise correspond the capacity of each wired connection over a multiple-hop path when the two packets are transmitted back-to-back and without dispersion (that is, no separation or minimized or otherwise reduced separation) between the last and the first bits of $P_h$ 304 and $P_t$ 306).

In a hybrid wired-wireless network with a wireless connection, a compound probe may arrive at a wireless AP with a zero-dispersion gap 310. This condition may enable measurement of the time to transmit $P_h$ 304 and $P_t$ 306 on the wireless connection without additional dispersions collected on the previous connection (produced by the heterogeneity of connection capacities and cross traffic). The download throughput of the wireless connection may be determined by the intra-packet gap 302 of the compound probe.

Figure 4:
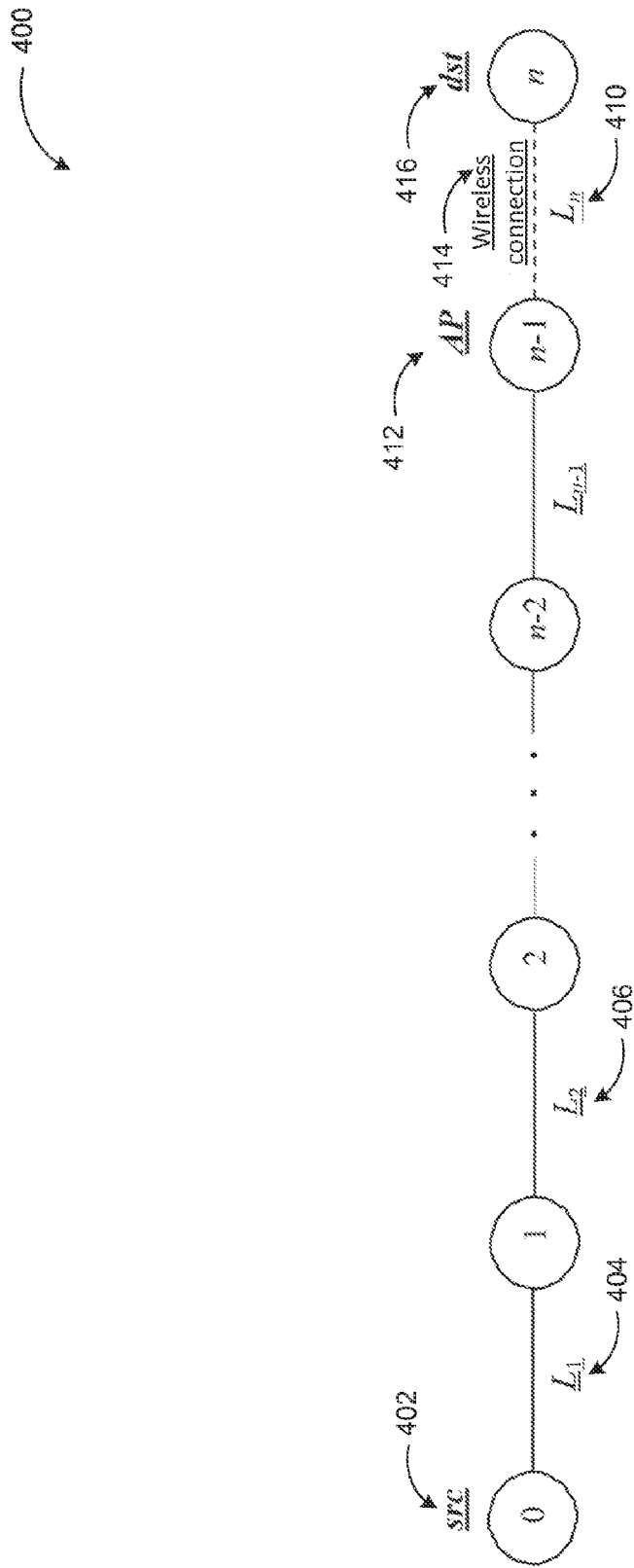
FIG. 4 illustrates multiple connections within a hybrid wired-wireless network including a wireless connection, where a download throughput may be measured or otherwise determined with compound probes.

Feasible sizes of $P_h$ and $P_t$ may be determined by the connection capacities along an end-to-end path to achieve a zero-dispersion gap 310. In a node I (as shown in FIG. 4), the compound probe may experience dispersion if the transmission time of $P_h$ 304 on an output connection $L_{i+1}$ of node I is smaller than the transmission time of $P_t$ 306 on an input connection $L_i$. The packet size ratio between $P_h$ 304 and $P_t$ 306 (that is, $\alpha = S_h/S_t$, where $S_h$ and $S_t$ are the sizes of $P_h$ and $P_t$, respectively) may be:

$$S_h/S_t \geq L_{i+1}/L_i, \quad [2]$$

where $L_{i+1}/L_i$ may be a connection capacity ratio ($lr_i$) of node I.

FIG. 4 illustrates multiple connections within a hybrid wired-wireless network including a wireless connection, where a download throughput may be measured or otherwise determined with compound probes, arranged in accordance with at least some embodiments described herein.

Diagram 400 shows connection capacities of an end-to-end path between a source host (src 402) and a wireless destination host (dst), including multiple wired connections and a wireless connection 414. The connection capacities may include $L_1$ (404), $L_2$ (406), ..., $L_n$ (410). The associated connection capacity ratios from src 402 to dst 416 may include $lr_1, lr_2, \ldots, lr_{n-1}$. The possible dispersion gap, $\delta_i$, (that is, any positive value) at node I, where $1 \leq I \leq (n-1)$, may include:

$$\delta_i = \{(S_h/L_{i+1}) + \Delta - (S_t/L_i)\} + \delta_{i-1}, \quad [3]$$

where $\Delta$ is the additional time to receive the ACK packet following the transmission of $P_h$ on the wireless connection 414. The additional time to receive ACK packet may be evaluated when $L_{i+1}$ is a wireless connection and is the dispersion gap at node i−1.

To measure or otherwise determine the throughput of the wireless connection (414) over the multiple-hop path in diagram 400, a condition to achieve a zero-dispersion gap in a compound probe with a heading-packet size $S_h$ at node n−1 (AP 412) may be:

$$\{(S_h/L_n) + \Delta - (S_h/\alpha L_{n-1})\} + \{(S_h/L_{n-1}) - (S_h/\alpha L_{n-2})\} + \ldots + \{(S_h/L_{z+1}) - (S_h/\alpha L_z)\} = 0, \quad [4]$$

where $L_n$ represents the connection capacity at node n and $\alpha$ is the packet size ratio of the compound probe (that is, $\alpha = S_h/S_t$)." $L_z$ is the input connection capacity of a node located after the minimum connection capacity of the node such that $lr_z = L_{z+1}/L_z$ is the connection capacity ratio of the node located after the narrow connection.

A critical (such as a maximum or otherwise large) size of $P_t$ (that is, $S_t$) may be determined by:

$$S_t = S_h \times \left\{ \left( \sum_{j=z+1}^{n} 1/L_j + \Delta \right) \Big/ \left( 1 \Big/ \sum_{j=z}^{n-1} L_j \right) \right\} \quad [5]$$

When the wireless connection $L_n$ is the bottleneck connection of the path, $S_t$ may be calculated by:

$$S_t = \{(S_h/L_{n-1}) + \Delta\} \times L_{n-1}. \quad [6]$$

A compound probe may experience the maximum or otherwise increased dispersion at a node over a path where the connection capacity ratio may be the maximum or otherwise large in value and the packet-size ratio may be smaller than the connection capacity ratio.

According to some embodiments, the measurement application may transmit two compound probes, each including multiple compound probes without any (or with minimal or otherwise smaller) dispersion gap from src 402 to dst 416 of an end-to-end path using a large $S_h$ value and two small $S_t$ values. The large $S_h$ value may include a Maximum Transmission Unit (MTU) size of the path. The two small $S_t$ values may include $S_a$ bytes for the first compound probe and $S_b$ bytes for the second compound probe where $S_a < S_b \leq$ critical size. The critical (such as a maximum or otherwise large) size may include the MTU and connection capacities of the path under measurement/determination. Upon receiving each compound probe at dst 416, the measurement application may determine the minimum (or otherwise smaller) and average intra-packet gaps (that is, $G_{min}(S_a)$ and $G_{avg}(S_a)$) of the first compound probe. The application may also determine the minimum (or otherwise smaller) intra-packet gap (that is, $G_{min}(S_b)$) of the second compound probe. The slope value of the wireless connection (that is, the reciprocal of wireless connection capacity) may be determined from the minimum intra-packet gaps of the two compound probes. The download throughput may be calculated by:

$$T = S_q / \{G_{avg}(S_p) - (m \times S_p) + (m \times S_q)\}, \quad [7]$$

where $S_q$ is any packet size and $S_q \neq S_p$. The download throughput may be calculated from the intra-packet gaps of the compound probes.

A measurement application according to some embodiments may transmit a compound probe to probe the wireless connection because the minimum (or otherwise smaller) and average intra-packet gaps of a compound probe may have variations on a wireless connection.

In some examples, the download throughput measurement algorithm may include the following actions:

1: $S_h$=path MTU,
2: $S_b \leq$critical size, where critical size is defined by $P_h$ and connection capacities of the path,
3: $S_t = S_a$, where $S_a < S_b$,
4: transmit compound probe with $S_h$ and $S_t$,
5: retrieve the minimum intra-packet gap (that is, $G_{min}(S_a)$),
6: retrieve the average intra-packet gap (that is, $G_{avg}(S_a)$),
7: $S_t = S_b$,
8: transmit compound probe with $S_h$ and $S_t$,
9: retrieve the minimum intra-packet gap (that is, $G_{min}(S_b)$),
10: $m = \{G_{min}(S_b) - G_{min}(S_a)\}/(S_b - S_a)$, and
11: calculate T using action 7.

The minimum intra-packet gap of a compound probe may be proportional to or otherwise correspond to the maximum or otherwise large transmission rate of the wireless connection when there is no collision. The average intra-packet gap may represent an achievable transmission rate of the wireless connection. The measurement application may perform a statistical analysis to determine the gap values in some examples.

The statistical analysis may include X as a sample set of intra-packet gaps of the compound probes. The measurement application may compute a mean x of X to determine the minimum or otherwise smaller intra-packet gap. If x may be the maximum or otherwise large intra-packet gap value in X, x may correspond to the minimum or otherwise smaller intra-packet gap. Otherwise, the following iterative process may determine the maximum or otherwise large intra-packet gap in X that may be available at the last iteration as the minimum or otherwise smaller intra-packet gap value of X:

1. calculate the standard deviation σ of the sample set of X,
2. discard all data elements of X greater than x,
3. iterate actions 1 and 2 after calculating x of the reduced sample set at action 2 until one of the following conditions occur:
   a. x is equal to the maximum intra-packet gap of the reduced sample set,
   b. σ at the current iteration is larger than that of the previous iteration, and
   c. σ has the same value in two consecutive iterations.

Alternatively or additionally, the average intra-packet gap of X may be identified by determining frequencies of intra-packet gaps in the sample set using a bins size of 9 μs (micro seconds) and then calculating the average of the gap values located in the bin that has the highest (or relatively larger) frequency. An adopted bin size (for example, 9 μs) may correspond to a minimum slot time (that is, a minimum unit of retransmission interval following a collision on a wireless connection).

Embodiments may be implemented via combinations of hardware and software components. The software components may operate with communication or signaling systems, to measure or otherwise determine a download throughput of a wireless connection with compound probes. Moreover, embodiments are not limited to wired and/or wireless systems, but may be implemented in any measurement/determination device/application used in any electronics system that uses the measurement/determination device/application such as wireless networks, speech processors, (medical) image processors, and similar ones.

While embodiments have been discussed above using specific examples, components, scenarios, and configurations in FIG. 1, FIG. 2, FIG. 3, and FIG. 4 they are intended to provide a general guideline to be used to measure or otherwise determine a download throughput of a wireless connection with probes. These examples do not constitute a limitation on the embodiments, which may be implemented using other components, optimization schemes, and configurations using the principles described herein. For example, other algorithms may be implemented than those provided as example.

Figure 5:
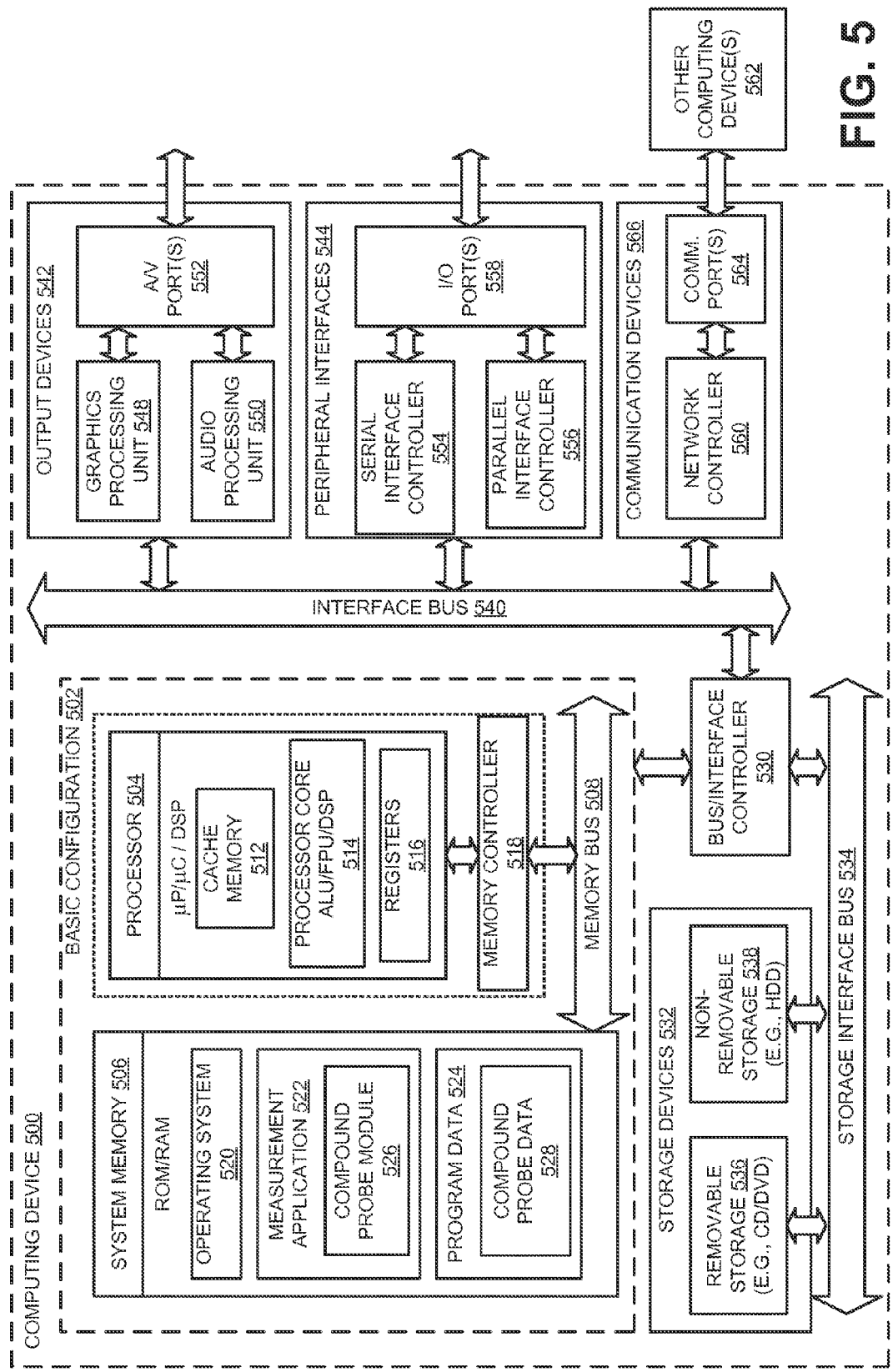
FIG. 5 illustrates a general purpose computing device, which may be used to measure or otherwise determine a download throughput of a wireless connection with compound probes.

FIG. 5 illustrates a general purpose computing device, which may be used to measure or otherwise determine a download throughput of a wireless connection with compound probes, arranged in accordance with at least some embodiments described herein. The computing device 500 of FIG. 5 may be one or both of the hosts 202 and 204, the router 208, the device 212, the host 206, or some other device that is not shown in FIG. 2. In a very basic configuration 502, computing device 500 typically includes one or more processors 504 and a system memory 506. A memory bus 508 may be used for communicating between processor 504 and system memory 506.

Depending on a particular configuration, processor 504 may be of any type including but not limited to a microprocessor (μP), a microcontroller (μC), a Digital Signal Processor (DSP), or any combination thereof. Processor 504 may include one more levels of caching, such as a cache memory 512, a processor core 514, and registers 516. Example processor core 514 may include an Arithmetic Logic Unit (ALU), a floating point unit (FPU), a Digital Signal Processing core (DSP Core), or any combination thereof. An example memory controller 518 may also be used with processor 504, or in some implementations memory controller 518 may be an internal part of processor 504.

Depending on the particular configuration, system memory 506 may be of any type including but not limited to volatile memory (such as RAM), non-volatile memory (such as ROM, flash memory, etc.) or any combination thereof. System memory 506 may include an operating system 520, one or more measurement applications 522, and program data 524. Measurement application 522 may include a compound probe module 526 that is arranged to measure or otherwise determine a download throughput of a wireless connection with compound probes. Program data 524 may include one or more of compound probe data 528 and similar data as discussed above in conjunction with at least FIGS. 1, 2, 3, and 4. This data may be useful for measuring or otherwise determining download throughput of a wireless connection as is described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and Hard-Disk Drives (HDDs), optical disk drives such as Compact Disk (CD) drives or Digital Versatile Disk (DVD) drives, Solid State Drives (SSDs), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store information and which may be accessed by computing device 500. Any such computer storage media may be part of computing device 500.

Computing device 500 may also include an interface bus 540 for facilitating communication from various interface devices (for example, output devices 542, peripheral interfaces 544, and communication devices 566) to basic configuration 502 via bus/interface controller 530. Example output devices 542 include a graphics processing unit 548 and an audio processing unit 550, which may be configured to communicate to various external devices such as a display or speakers via one or more A/V ports. Example peripheral interfaces 544 include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 566 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a physical server, virtual server, a computing cloud, or a hybrid device that include any of the above functions. Computing device 500 may also be implemented as a personal computer including both laptop computer and non-laptop computer configurations. Moreover, computing device 500 may be implemented as a networked system or as part of a general purpose or specialized server.

Networks for a networked system including computing device 500 may comprise any topology of servers, clients, switches, routers, modems, Internet service providers, and any appropriate communication media (for example, wired or wireless communications). A system according to embodiments may have a static or dynamic network topology. The networks may include a secure network such as an enterprise network (for example, a LAN, WAN, or WLAN), an unsecure network such as a wireless open network (for example, IEEE 802.11 wireless networks), or a world-wide network such (for example, the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 6:
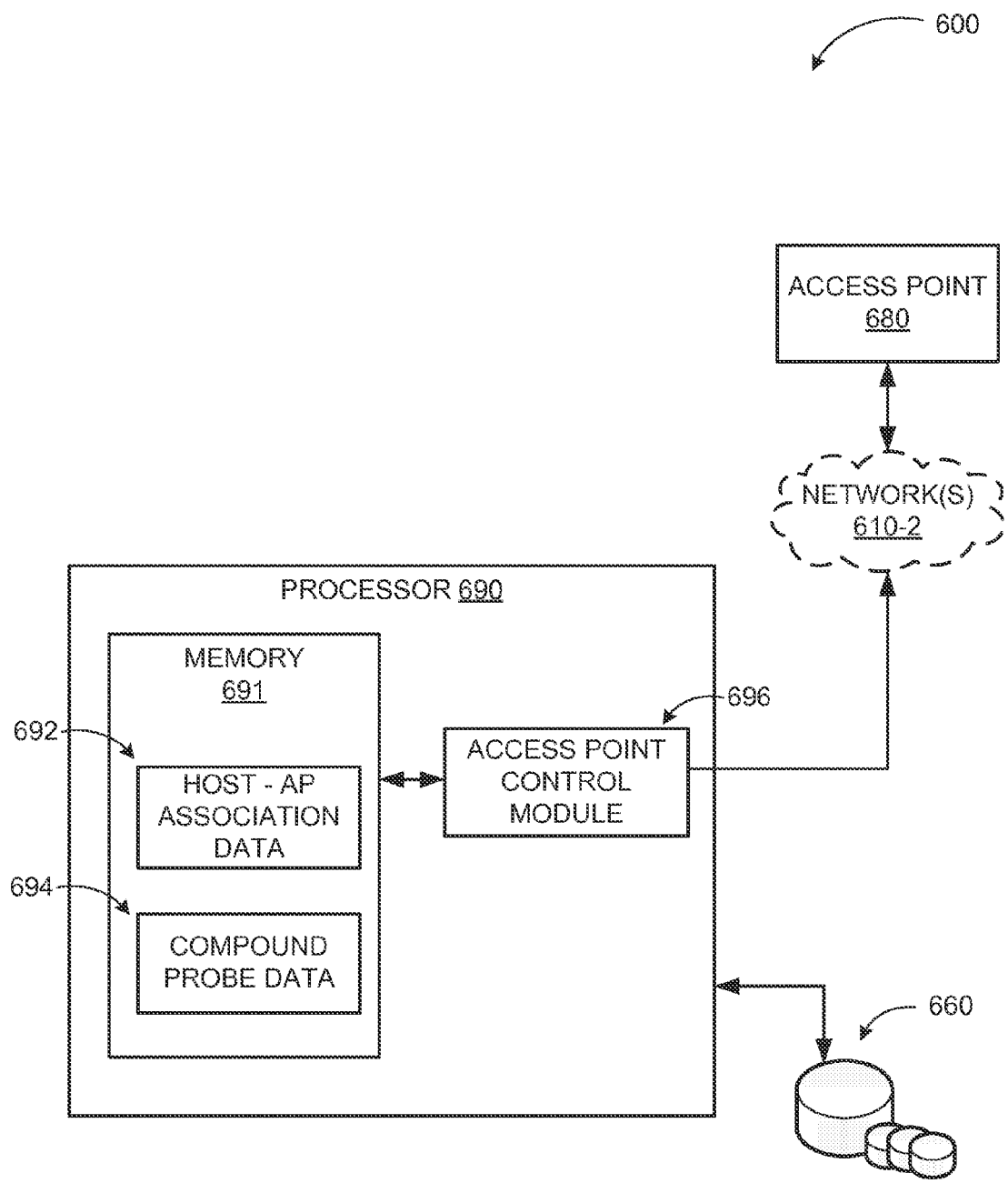
FIG. 6 illustrates a special purpose processor, which may be used to measure or otherwise determine a download throughput of a wireless connection with compound probes.

FIG. 6 illustrates a special purpose processor, which may be used to measure or otherwise determine a download throughput of a wireless connection with compound probes in accordance with at least some embodiments discussed within. The processor 690 of FIG. 6 may be implemented in a computing device such as the computing device 500 of FIG. 5, one or both of the hosts 202 and 204, the router 208, the device 212, the host 206 of FIG. 2, or some other device that is not shown in FIG. 2.

Processor 690 in diagram 600 may be part of a computing device (for example, a controller for the wireless network) that is communicatively coupled to one or more access points 680, which may facilitate communication with host devices through network(s) 610-2. Processor 690 may alternatively communicate with the access point 680 over other networks such as wired networks, microwave networks, etc. Access point 680 may include antenna and controllers, to measure a download throughput of a wireless connection with compound probes. Processor 690 may store compound probe related data at one or more data stores 660.

Processor 690 may include a number of processing modules such as access point (AP) control module 696. Host-AP association data 692 and compound probe data 694 may be used by processor 690 in conjunction with AP control module 696 to measure or otherwise determine a download throughput of a wireless connection with compound probes. Host-AP association data 692 and compound probe data 694 may be stored during processing in memory 691, which may be a cache memory of the processor 690 or in an external memory (for example, memory external to processor 690). In some embodiments, processor 690 may also be implemented as part of a portable AP. In one embodiment, the processor of FIG. 6 may be implemented in the processor 504 of FIG. 5.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 7:
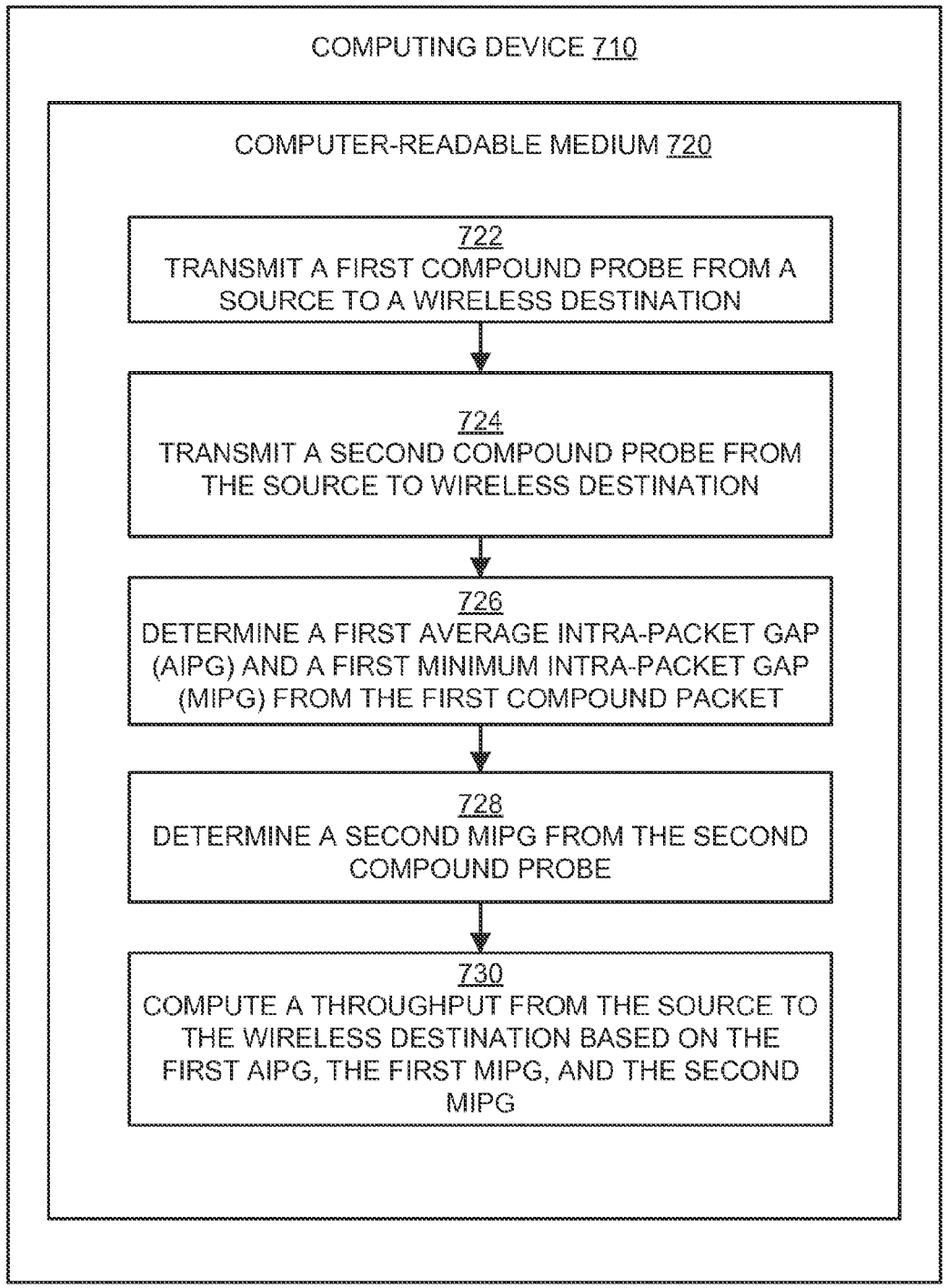
FIG. 7 is a flow diagram illustrating an example method to measure or otherwise determine a download throughput of a wireless connection with compound probes.

FIG. 7 is a flow diagram illustrating an example method to measure or otherwise determine a download throughput of a wireless connection with compound probes that may be performed by a computing device 710, such as the computing device 500 in FIG. 5 or the special purpose processor 690 in FIG. 6, arranged in accordance with at least some embodiments described herein.

Thus, computing device 710 may be embodied as computing device 500, special purpose processor 690, or similar devices executing instructions stored in a non-transitory computer-readable medium 720 for performing the method. A process to measure or otherwise determine a download throughput of a wireless connection with compound probes may include one or more operations, functions or actions as is illustrated by one or more of blocks 722, 724, 726, 728 and/or 730.

Some example processes may begin with operation 722, "TRANSMIT A FIRST COMPOUND PROBE FROM A SOURCE TO A WIRELESS DESTINATION". At operation 722, a network controller such as processor 690 of FIG. 6 may transmit or cause to transmit (such as via communication devices 566 in FIG. 5) first heading and trailing packets with no separation between a last bit of the heading packet and a first bit of the trailing packet to produce the first compound probe.

Operation 722 may be followed by operation 724, "TRANSMIT A SECOND COMPOUND PROBE FROM THE SOURCE TO WIRELESS DESTINATION." At operation 724, the processor 690 may transmit or cause to transmit (such as via communication devices 566 in FIG. 5) first heading and trailing packets with no separation between a last bit of the heading packet and a first bit of the trailing packet to produce the second compound probe.

Operation 724 may be followed by operation 726, "DETERMINE A FIRST AVERAGE INTRA-PACKET GAP (AIPG) AND A FIRST MINIMUM INTRA-PACKET GAP (MIPG) FROM THE FIRST COMPOUND PACKET." At operation 726, the processor 690 may determine the first AIPG and the first MIPG using a size of the trailing packet of the first compound probe.

Operation 726 may be followed by operation 728, "DETERMINE A SECOND MIPG FROM THE SECOND COMPOUND PROBE." At operation 728, the processor 690 may determine the second MIPG using a size of the trailing packet of the second compound probe.

Operation 728 may be followed by operation 730, "COMPUTE A THROUGHPUT FROM THE SOURCE TO THE WIRELESS DESTINATION BASED ON THE FIRST AIPG, THE FIRST MIPG, AND THE SECOND MIPG." At operation 730, the processor 690 may compute the download throughput using a calculation including the first and second MIPGs and the first AIPG.

The operations included in the process of FIG. 7 described above are for illustration purposes. Measurement or other determination of download throughput of a wireless connection with compound probes may be implemented by similar processes with fewer or additional operations. In some examples, the operations may be performed in a different order. In some other examples, various operations may be eliminated. In still other examples, various operations may be divided into additional operations, or combined together into fewer operations. In yet other embodiments, additional operations may be performed. Although illustrated as sequentially ordered operations, in some implementations the various operations may be performed in a different order, or in some cases various operations may be performed at substantially the same time.

FIG. 8 illustrates a block diagram of an example computer program product to measure or otherwise determine a download throughput of a wireless connection with compound probes, arranged in accordance with at least some embodiments described herein.

In some examples, as shown in FIG. 8, computer program product 800 may include a signal bearing medium 802 that may also include machine readable instructions 804 that, in response to execution by, for example, a processor, may provide the functionality described above with respect to FIG. 1 through FIG. 7. Thus, for example, referring to processor 690, one or more of the tasks shown in FIG. 8 may be undertaken in response to instructions 804 conveyed to the processor 690 by signal bearing medium 802 to perform actions associated with measurement or other determination of a download throughput of a wireless connection with compound probes as described herein. Some of those instructions may include transmitting a first compound probe from a source to a wireless destination; transmitting a second compound probe from the source to the wireless destination; determining a first average intra-packet gap (AIPG) and a first minimum or otherwise smaller intra-packet gap (MIPG) from the first compound probe; determining a second MIPG from the second compound probe; and computing the download throughput from the source to the wireless destination based on the first AIPG, the first MIPG, and the second MIPG.

In some implementations, signal bearing medium 802 depicted in FIG. 8 may encompass a non-transitory computer-readable medium 806, such as, but not limited to, a hard disk drive, a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (for example, a fiber optic cable, a waveguide, a wired communications link, a wireless communication link, etc.). Thus, for example, computer program product 800 may be conveyed to the processor 804 by an RF signal bearing medium 802, where the signal bearing medium 802 is conveyed by a wireless communications medium 810 (for example, a wireless communications medium conforming with the IEEE 802.11 standard).

According to some examples, a method is provided to determine a download throughput of a wireless connection with compound probes. An example method may include transmitting a first compound probe from a source to a wireless destination, transmitting a second compound probe from the source to the wireless destination, and determining a first average intra-packet gap (AIPG) and a first minimum intra-packet gap (MIPG) from the first compound probe. The method may further include determining a second MIPG from the second compound probe and computing the download throughput from the source to the wireless destination based on the first AIPG, the first MIPG, and the second MIPG.

According to other examples, the method may further include including a first heading packet and a first trailing packet in the first compound probe, and including a second heading packet and a second trailing packet in the second compound probe. Transmitting the first compound probe may include transmitting the first heading packet and the first trailing packet back-to-back without a separation between a last bit of the first heading packet and a first bit of the first trailing packet. Transmitting the second compound probe may include transmitting the second heading packet and the second trailing packet back-to-back without a separation between a last bit of the second heading packet and a first bit of the second trailing packet.

According to further examples, the methods may also include selecting a heading packet size as a maximum transmission unit (MTU) size of a path from the source to the wireless destination and selecting a second trailing packet size of the second trailing packet to be at least one of: less than and equal to a particular size, where the particular size is defined by the first heading packet and a connection capacity of the path. The method may also include selecting a first trailing packet size of the first trailing packet to be less than the second trailing packet size. Transmitting the first compound probe may include transmitting the first compound probe using the heading packet size for the first heading packet and the first trailing packet size for the first trailing packet.

According to yet other examples, the method may further include determining the first MIPG using the first trailing packet size and/or determining the first AIPG using the first trailing packet size. Transmitting the second compound probe may include transmitting the second compound probe using the heading packet size for the second heading packet and the second trailing packet size for the second trailing packet. The method may also include determining the second MIPG using the second trailing packet size. The download throughput is determined based on a first value equal to the first MIPG subtracted from the second MIPG, a second value equal to the first trailing packet size subtracted from the second trailing packet size, and the first value divided by the second value.

According to other examples, an apparatus is provided. The apparatus may include a controller to determine a download throughput of a wireless connection with compound probes and a compound probe module operatively coupled to the controller. The compound probe module may be configured to control transmission of a first compound probe from a source to a wireless destination, include a first heading packet and a first trailing packet in the first compound probe, control transmission of a second compound probe from the source to the wireless destination, and include a second heading packet and a second trailing packet in the second compound probe. The compound probe module may be further configured to determine a first average intra-packet gap (AIPG) and a first minimum intra-packet gap (MIPG) from the first compound probe, determine a second MIPG from the second compound probe, and compute the download throughput from the source to the wireless destination based on the first AIPG, the first MIPG, and the second MIPG.

According to some examples, the compound probe module may further control transmission of the first heading packet and the first trailing packet back-to-back without a separation between a last bit of the first heading packet and a first bit of the first trailing packet; and control transmission of the second heading packet and the second trailing packet back-to-back without a separation between a last bit of the second heading packet and a first bit of the second trailing packet. The compound probe module may also select a heading packet size as a maximum transmission unit (MTU) size of a path from the source to the wireless destination and select a second trailing packet size of the second trailing packet to be at least one of: less than and equal to a particular size, where the particular size is defined by the first heading packet and a connection capacity of the path. The compound probe module may further select a first trailing packet size of the first trailing packet to be less than the second trailing packet size.

According to further examples, to control transmission of the first compound probe, the compound probe module may be configured to control transmission of the first compound probe using the heading packet size for the first heading packet and the first trailing packet size for the first trailing packet, where to determine the first AIPG and the first MIPG, the first compound probe module is configured to determine the first MIPG using the first trailing packet size and determine the first AIPG using the first trailing packet size.

According to yet other examples, to control transmission of the second compound probe, the compound probe module may be configured to transmit the second compound probe using the heading packet size for the second heading packet and the second trailing packet size for the second trailing packet, where to determine the second MIPG, the compound probe module is configured to determine the second MIPG using the second trailing packet size. To compute the download throughput, the compound probe module may be configured to determine the download throughput based on: a first value equal to the first MIPG subtracted from the second MIPG, a second value equal to the first trailing packet size subtracted from the second trailing packet size, and the first value divided by the second value.

According to yet further examples, a computer-readable storage medium may be provided with instructions stored thereon to determine a download throughput of a wireless connection with probes. The instructions may cause a method to be performed in response to execution, where the method may include transmitting a first compound probe from a source to a wireless destination, including a first heading packet and a first trailing packet in the first compound probe, transmitting the first heading packet and the first trailing packet back-to-back between a last bit of the first heading packet and a first bit of the first trailing packet, and transmitting a second compound probe from the source to the wireless destination. The method may also comprise including a second heading packet and a second trailing packet in the second compound probe, transmitting the second heading packet and the second trailing packet back-to-back between a last bit of the second heading packet and a first bit of the second trailing packet, determining a first intra-packet gap and a second intra-packet gap from the first compound probe, determining a third intra-packet gap from the second compound probe, and computing a throughput from the source to the wireless destination based on the first intra-packet gap, the second intra-packet gap, and the third intra-packet gap.

According to some examples, the first, second, and third intra-packet gaps may respectively include a first average intra-packet gap (AIPG), a first minimum intra-packet gap (MIPG), and a second MIPG. Transmitting the first heading packet and the first trailing packet back-to-back may include transmitting the first heading packet and the first trailing packet without a separation between the last bit of the first heading packet and the first bit of the first trailing packet. Transmitting the second heading packet and the second trailing packet back-to-back may also include transmitting the second heading packet and the second trailing packet without a separation between the last bit of the second heading packet and the first bit of the second trailing packet.

According to yet other examples, a computer readable medium may store instructions to determine a download throughput of wireless connection with compound probes. The instructions may cause a method to be performed in response to execution, the method being similar to the methods described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to determine a download throughput of a wireless connection, the method comprising:
    including a first heading packet and a first trailing packet in a first compound probe;
    transmitting the first compound probe from a source to a wireless destination by transmitting the first heading packet and the first trailing packet back-to-back without a separation between a last bit of the first heading packet and a first bit of the first trailing packet;
    including a second heading packet and a second trailing packet in a second compound probe;
    transmitting the second compound probe from the source to the wireless destination by transmitting the second heading packet and the second trailing packet back-to-back without a separation between a last bit of the second heading packet and a first bit of the second trailing packet;
    determining a first average intra-packet gap (AIPG) and a first minimum intra-packet gap (MIPG) from the first compound probe;
    determining a second MIPG from the second compound probe; and
    computing the download throughput from the source to the wireless destination based on the first AIPG, the first MIPG, and the second MIPG.

2. The method of claim 1, further comprising:
    selecting a heading packet size as a maximum transmission unit (MTU) size of a path from the source to the wireless destination;
    selecting a second trailing packet size of the second trailing packet to be at least one of: less than and equal to a particular size, wherein the particular size is defined by the first heading packet and a connection capacity of the path; and
    selecting a first trailing packet size of the first trailing packet to be less than the second trailing packet size.

3. The method of claim 2, wherein transmitting the first compound probe includes transmitting the first compound probe using the heading packet size for the first heading packet and the first trailing packet size for the first trailing packet.

4. The method of claim 2, wherein determining the first MIPG includes:
    determining the first MIPG using the first trailing packet size.

5. The method of claim 2, wherein determining the first AIPG includes:
    determining the first AIPG using the first trailing packet size.

6. The method of claim 2, wherein transmitting the second compound probe includes transmitting the second compound probe using the heading packet size for the second heading packet and the second trailing packet size for the second trailing packet.

7. The method of claim 6, wherein determining the second MIPG includes:
    determining the second MIPG using the second trailing packet size.

8. The method of claim 2, wherein computing the download throughput includes:
    determining the download throughput based on:
        a first value equal to the first MIPG subtracted from the second MIPG;
        a second value equal to the first trailing packet size subtracted from the second trailing packet size; and
        the first value divided by the second value.

9. An apparatus, comprising:
    a controller to determine a download throughput of a wireless connection with compound probes; and
    a compound probe module operatively coupled to the controller and configured to:
        control transmission of a first compound probe from a source to a wireless destination;
        include a first heading packet and a first trailing packet in the first compound probe;
        control transmission of the first heading packet and the first trailing packet back-to-back without a separation between a last bit of the first heading packet and a first bit of the first trailing packet;
        control transmission of a second compound probe from the source to the wireless destination;
        include a second heading packet and a second trailing packet in the second compound probe;
        control transmission of the second heading packet and the second trailing packet back-to-back without a separation between a last bit of the second heading packet and a first bit of the second trailing packet;

determine a first average intra-packet gap (AIPG) and a first minimum intra-packet gap (MIPG) from the first compound probe;

determine a second MIPG from the second compound probe; and compute the download throughput from the source to the wireless destination based on the first AIPG, the first MIPG, and the second MIPG.

10. The apparatus according to claim 9, wherein the compound probe module is further configured to:

select a heading packet size as a maximum transmission unit (MTU) size of a path from the source to the wireless destination;

select a second trailing packet size of the second trailing packet to be at least one of: less than and equal to a particular size, wherein the particular size is defined by the first heading packet and a connection capacity of the path; and select a first trailing packet size of the first trailing packet to be less than the second trailing packet size.

11. The apparatus according to claim 10, wherein to control transmission of the first compound probe, the compound probe module is configured to:

control transmission of the first compound probe using the heading packet size for the first heading packet and the first trailing packet size for the first trailing packet; and wherein to determine the first AIPG and the first MIPG, the compound probe module is configured to:

determine the first MIPG using the first trailing packet size; and determine the first AIPG using the first trailing packet size.

12. The apparatus according to claim 10, wherein to control transmission of the second compound probe, the compound probe module is configured to:

transmit the second compound probe using the heading packet size for the second heading packet and the second trailing packet size for the second trailing packet; and wherein to determine the second MIPG, the compound probe module is configured to determine the second MIPG using the second trailing packet size.

13. The apparatus according to claim 10, wherein to compute the download throughput, the compound probe module is configured to:

determine the download throughput based on:

a first value equal to the first MIPG subtracted from the second MIPG;

a second value equal to the first trailing packet size subtracted from the second trailing packet size; and the first value divided by the second value.

14. A non-transitory computer-readable storage medium with instructions stored thereon to determine a download throughput of a wireless connection with probes, the instructions in response to execution cause a method to be performed, wherein the method comprises:

transmitting a first compound probe from a source to a wireless destination;

including a first heading packet and a first trailing packet in the first compound probe;

transmitting the first heading packet and the first trailing packet back-to-back between a last bit of the first heading packet and a first bit of the first trailing packet;

transmitting a second compound probe from the source to the wireless destination;

including a second heading packet and a second trailing packet in the second compound probe;

transmitting the second heading packet and the second trailing packet back-to-back between a last bit of the second heading packet and a first bit of the second trailing packet;

determining, a first intra-packet gap and a second intra-packet gap from the first compound probe;

determining a third intra-packet gap from the second compound probe; and computing the download throughput from the source to the wireless destination based on the first intra-packet gap, the second intra-packet gap, and the third intra-packet gap.

15. The non-transitory computer-readable storage medium according to claim 14, wherein the first, second, and third intra-packet gaps respectively include a first average intra-packet gap (AIPG), a first minimum intra-packet gap (MIPG), and a second MIPG.

16. The non-transitory computer-readable storage medium according to claim 14, wherein transmitting the first heading packet and the first trailing packet back-to-back includes transmitting the first heading packet and the first trailing packet without a separation between the last bit of the first heading packet and the first bit of the first trailing packet.

17. The non-transitory computer-readable storage medium according to claim 14, wherein transmitting the second heading packet and the second trailing packet back-to-back includes transmitting the second heading packet and the second trailing packet without a separation between the last bit of the second heading packet and the first bit of the second trailing packet.

* * * * *